United States Patent [19]

Earp

[11] Patent Number: 4,952,242

[45] Date of Patent: Aug. 28, 1990

[54] COMPOSITION FOR SOLIDIFICATION OR SEMI-SOLIDIFICATION OF WASTE MATERIALS

[76] Inventor: Eugene F. Earp, 6026 Chattanooga Dr., Baton Rouge, La. 70817

[21] Appl. No.: 174,973

[22] Filed: Mar. 29, 1988

[51] Int. Cl.$^5$ .............................................. C04B 7/02
[52] U.S. Cl. ..................... 106/709; 106/735; 106/717; 106/737; 106/738; 210/751; 405/128
[58] Field of Search ..................... 210/751; 106/89, 98; 405/128, 129

[56] References Cited

U.S. PATENT DOCUMENTS

| | | | |
|---|---|---|---|
| 4,028,130 | 6/1977 | Webster et al. | 210/751 X |
| 4,105,459 | 8/1978 | Mehta | 106/98 |
| 4,108,677 | 8/1978 | Valiga | 106/109 |
| 4,124,405 | 11/1978 | Quienot | 210/751 X |
| 4,238,374 | 12/1980 | Durham | 47/41.12 |
| 4,374,672 | 2/1983 | Funston | 106/97 |
| 4,428,700 | 1/1984 | Lennemann | 405/128 |
| 4,453,857 | 6/1984 | Serra | 405/128 |
| 4,460,292 | 7/1984 | Durham et al. | 405/129 |
| 4,514,307 | 4/1985 | Chestnut et al. | 210/908 X |
| 4,555,448 | 11/1985 | Durham | 428/402 |
| 4,600,514 | 7/1986 | Conner | 210/751 |
| 4,615,809 | 10/1986 | King | 210/751 |
| 4,645,605 | 2/1987 | Durham | 210/679 |
| 4,707,176 | 11/1987 | Durham | 71/23 |

*Primary Examiner*—Tom Wyse
*Attorney, Agent, or Firm*—David L. Ray

[57] ABSTRACT

A method and composition for solidification or semicolidification of single or multi-phased waste including mixing the waste with a composition including having as its major component a cement, and, as lesser components, a fixative, an absorbant, and optionally an emulsifier. The composition of the invention is mixed with the waste and dried.

6 Claims, No Drawings

COMPOSITION FOR SOLIDIFICATION OR SEMI-SOLIDIFICATION OF WASTE MATERIALS

BACKGROUND OF THE INVENTION

1. Field of the Invention

The invention relates to waste treatment. More particularly, the present invention relates to method and composition for the solidification or semi solidification of waste materials containing both liquid and solid phases.

2. Description of the Prior Art

The disposition of hazardous and offensive waste materials is a major problem for both industry and the populace of most industrialized nations. As industry has grown and the population has grown, disposal sites for hazardous and offensive waste are becoming increasingly difficult to locate. Increasing knowledge of the dangers to the populace created by the disposition of hazardous and offensive waste have placed limitations on the availability of waste sites and the method of disposing of various wastes at any selected sites.

Many governmental regulations have been issued by both state and federal governmental bodies restricting the manner in which hazardous or offensive waste materials may disposed. One of the primary objectives of most legislation is to solidify the liquid phases of hazardous waste and contain both the liquid and the solid phase within a matrix which will prevent the migration of the waste into the environment.

Many effects have been made in the art to solidify or confine liquid and solid waste to prevent pollution of the environment. Exemplary of the prior art are the following U.S. Patents:

U.S. Pat. No. 4,600,514 discloses a method for controlling the gelling time for solidification of multi-phase wastes. A waste is admixed with cement, a powdered alkali metal silicate, and a liquid alkali metal silicate in relative quantities sufficient to cause the admixture to gel and set to a sedentary mass.

U.S. Pat. No. 4,460,292 discloses a process for containment of liquids as solids or semi-solids including absorbing the liquid in biogenetic silica in amorphous state having a porous skeletal structure, a major portion of the liquid being contained in void spaces of the porous skeleton, the biogenetic silica being present in an amount sufficient to contain the liquid in at least a semisolid mass.

U.S. Pat. No. 4,453,857 discloses a method for storing hazardous or toxic waste material by placing the waste material in sealed containers within a solid concrete block buried in the earth. A concrete chamber with integrated floor and side walls is formed in the ground, and a first group of sealed, filled containers is arranged on the floor and covered with concrete. Structure is provided to collect and recycle any leachate which escapes the concrete chamber.

U.S. Pat. No. 4,428,700 discloses a method for disposing of waste materials including depositing the waste material in an excavation and encasing the waste material with a molten composition poured in to the excavation, the composition being the reaction product of sulfur and about 2 to 40 percent of a modifier selected from the group including dicyclopentadiene, dipentene, vinyltoluene and oligomers of cyclopentadiene, and allowing the molten composition to harden to form a solid mass having the waste material incorporated therein.

U.S. Pat. No. 4,374,672 discloses a method and composition for producing a stabilized fill material, the fill material including fly ash cement and water, including mixing the material and depositing it directly in water by equipment supported on previously deposited fill material to form a causeway or the like.

U.S. Pat. No. 4,108,677 discloses a process for treating waste sludge from combustion plant desulfurization units and cementitious products produced by the process. The method for hardening inorganic aqueous waste sludge including calcium salts includes thickening the sludge by removing a portion of the liquid content, calcining the residual solids, withdrawing a second portion of the thickened sludge and mixing the partially dewatered sludge and at least a portion of the intermediate product to produce a hardenable product.

SUMMARY OF THE PRESENT INVENTION

Accordance with the present invention there is provided a method and composition for solidification or semisolidification of single or multi-phased waste including mixing the waste with a composition including having as its major component a cement, and, as lesser components, a fixative, an absorbant, and optionally an emulsifier. The composition of the invention is mixed with the waste and dried.

The method and composition of the invention have the advantages that single phase waste or multi-phased waste containing both liquids and solids can be converted into solids or semi-solids which may be easily transported to a disposal site and which will not release environmentally significant amounts of leachate.

The method and composition of the invention have a further advantage in that the composition may be introduced directly into the container or reservoir holding the waste and manually or mechanically mixed therewith to form a solid or semi-solid product capable of being loaded, transported and disposed of in a land fill or other hazardous waste disposal site without producing environmentally sufficient amounts of leachate.

A further advantage of the invention is that some multi-phase waste can be converted to a earth-like product after mixing with the composition of the present invention, and the earth-like product can be handled and disposed of in the same manner as dirt.

DESCRIPTION OF THE PREFERRED EMBODIMENTS

The present invention provides a composition for the solidification or semisolidification of single phase and multiphase waste, and a method for the solidification or semisolidification of single phase or multi-phase waste including mixing the composition of the present invention with a multiphase waste and drying the mixture to form a semisolid or solid mixture which has environmentally acceptable amounts of leachate.

The composition of the invention includes a bonding matrix, a fixative, and an absorbent. An emulsifier may be included when the composition is used to solidify single or multi-phase wastes containing a high amount of emulsifiable liquids.

The bonding matrix bonds the waste and the other components of the composition together and is a cement for all the components in the final product. Preferred bonding matrixes are Portland cement, Types I, II, III, IV, and V, the most preferred bonding matrix being Portland cement type I.

The composition of the present invention contains enough cement to bond the waste and other components of the composition together to form either a solid or semisolid mixture depending upon the type of mixture desired. In some cases it is desirable to convert the waste product after mixing with the solidification composition of the present invention to a semisolid dirt-like substance. The dirt-like substance can be easily transported and dumped into a land fill or other disposal area.

Preferably, the bonding matrix comprises from about 50 to about 65 percent by weight of the total weight of the solidification composition of the invention. More preferably, the bonding matrix comprises from about 50 to about 60 percent by weight of the total weight of the composition of the invention.

The composition of the invention also contains a fixative for binding the ingredients of the composition for solidifying waste to the waste and to control the time required for the mixture of the composition and waste to set. Suitable fixatives include calcium sulfate and compounds of calcium sulfate with water such as calcium sulfate dihydrate ($CaSO_4:2H_2O$) and calcium carbonate and compounds of calcium carbonate with water such as calcium carbonate dihydrate ($CaCO_3:2H_2O$). The preferred fixative is calcium sulfate dihydrate, sometimes referred to as gypsum.

The amount of the fixative in the composition of the present invention is sufficient to the waste material. Preferably, the composition of the present invention contains from about 20 percent to about 28 percent by weight of the fixative. More preferably, the composition of the present invention contains from about 22 percent to about 25 percent by weight of the fixative.

The composition contains an absorbent to absorb the liquids of the liquid phase of multi-phased waste. Many different absorbents may be used such as activated carbon, diatomaceous earth and biogenetic, amorphus, silica ash ($SiO_2$). Preferably, biogenetic, amorphus, silica ash ($SiO_2$) containing about 5 percent carbon is utilized as the absorbent of the present invention.

The absorbent is present in the composition of the present invention in an amount sufficient to absorb the liquid phase present in a particular waste being converted to a semisolid or solid form. Preferably, the composition of the present invention contains from about 5 percent to about 20 percent by weight of the absorbent. Most preferably the composition of the invention contains from about 7 to about 10 percent by weight of an absorbent.

The composition of the present invention may optionally contain an emulsifier for emulsifying any liquids contained in the waste product being treated. The emulsifier may be sodium phosphate, sodium carbonate or any other well known emulsifier for the liquid or liquids contained in the waste. The preferred emulsifiers are sodium phosphate or sodium carbonate, or a mixture thereof. Most preferably the composition of the invention contains about 5 to about 10 percent by weight of an emulsifier.

The method of the present invention includes mixing the composition of the present invention with the multiphase waste product to form a solid or semisolid mixture suitable for environmentally safe. The ratio of the solidification composition of the present invention by weight to the waste product with which the solidification composition of the invention is mixed varies from about 2:1 to about 4:1. Preferably, the ratio of the solidification composition of the present invention by weight to the waste product being treated varies from about 2.5:1 to 3.5:1. Most preferably, the ratio of the solidification composition of the present invention by weight to the waste being treated varies from about 2.9:1 to 3.1:1.

The composition of the present invention may be mechanically mixed with the waste product being treated. Water may be added in an amount sufficient to permit complete mixing of the solidification composition of the present invention with the waste material being treated. After mixing the waste with the solidification composition of the present invention the mixture is allowed to dry at ambient conditions (50°–1100° F.). The amount of time required to dry usually varies from about 3 days to about 5 days depending upon the waste product being treated and ambient temperatures and humidity.

A large variety of waste products may be treated in accordance with the present invention. The waste products may contain oil, gasoline and other hydrocarbons as exemplified by API separator sludge which contains sulfides and iron. A 2:1 ratio by weight of the solidification composition of the present invention to the waste product was effective in the treatment of waste products including ethyl alcohol, butanol, 1,2 dichloroethane, benzene, acetonitrile, sodium hydroxide, acetic acid, various metals, and contaminate drilling mud, and mixtures thereof. Thus, virtually any waste containing hydrocarbons and most types of oils may be treated in accordance with the present invention. While the present invention is particularly useful in treating multiphase waste materials, the invention can also be use to treat single phase waste material such as liquid waste or solid waste.

EXAMPLE 1

A waste product was prepared similar to waste hydrocarbons found in open pits in the State of Louisiana and other oil productive states. The initial waste product had the following amounts of ingredients in parts by volume:

| INGREDIENTS | PARTS BY VOLUME |
| --- | --- |
| Benzene | 5.0 |
| Chloroform | 3.0 |
| Trichlorethane | 142.0 |
| Ethylbenzene | 16.0 |
| Toluene | 48.0 |
| Xylene | 86.0 |

Two and one-half gallons (approximately 20 lbs.) of the above initial waste material, ½ gallon (3 lbs.) of heavy crude oil, ½ gallon (4 lbs.) of fuel oil, 10 lbs. of soil, and 2 gallons (16 lbs.) of water were mixed together to simulate a liquid sludge. The components of the sludge were mixed together to obtain uniformity. Total weight of the sludge was 53 lbs.

The solidification composition of the invention contained approximately 53 lbs. of Portland cement, 26½ lbs. of calcium sulfate dihydrate, and 26.5 of Enviroguard ®, which is a biogenetic, amorphus, silica ash ($SiO_2$) containing about 5% by weight carbon and is manufactured by Agritec, Inc. of Houston, Tex. A total weight of 106 lbs. of the solidification composition was added to the waste.

The waste and the solidification composition of the invention were blended together with a paddle. Within 18 hours of mixing a thickening of the mixture was observed. The tank in which the mixture was blended was a 55 gallon drum laid horizontally on a pallet and open longitudinally at the top. The drum became filled with water due to a rain storm. However, the tank was not filled to overflowing. The water in the tank was removed and the surface was tested for the lower explosive limit using a flammable gas meter. Tests for benzene and toluene were performed. Only traces of amounts of gas, benzene and toluene were detected at the surface of the mixture.

Within 24 hours a definite hardening pattern developed and the mixture took on the consistency of shale. After 3 days of being mixed the waste mixture had hardened to a product akin to light concrete. At 3½ days after mixing the waste mixture gave up about 25% of the crude oil as a leachate on the surface of the mixture. The waste showed surface leachate at either end of the tank only. Thus, all components other than crude oil were locked within the mixture.

After removal of the crude oil and the initial water from the surface of the mixture, the rain water collected on the surface of the test tank was removed to a small part of grass removed and placed on a small of grass. The grass remained green and lush. No damaging effects were observed.

EXAMPLE 2

Approximately 4 lbs. of crude oil (2 pints) simulating a waste containing oil was mixed with 11½ lbs. of Portland cement, a fixative in the amount 7.2 lbs. calcium sulfate dihydrate, 6 lbs. of an absorbent which was Enviroguard ®, and 1 lb. of a biodegradable detergent to act as an emulsifier containing sodium phosphate and sodium carbonate in approximately equal amounts by weight. Water in the amount of one pint was added to above mixture and the water, oil waste and solidification composition of the invention were mixed manually in a 1 gallon plastic pale. The weight ratio of the solidification composition of the invention to the weight of oil and water was 5.1:1.

Twenty-four hours after mixing, the mixture appeared mushy and watery. Three days after mixing the mixture product had a dark appearance similar to light cement and water was continuing to evaporate from the blend. The blend was exposed to sunlight and rain for five days after blending and at that time there was a slight oil sheen on the surface of the rain water on the surface of the mixture. The mixture had turned to a grey black color and was similar to soapstone in hardness.

EXAMPLE 3

Approximately 125 ml. of ethyl alcohol and 100 ml. of water were mixed together to simulate a liquid waste. About 250 ml. of the same solidifying composition of the invention disclosed in Example 1 was added to the waste product and mixed therewith. After 3 days the mixture of waste product and solidifying composition of the invention solidified in a form akin to soapstone.

EXAMPLE 4

Approximately 125 ml. of butanol and 100 ml. of water were mixed together to simulate a liquid waste. About 250 ml. of the same solidifying composition of the invention disclosed in Example 1, having added thereto 9 weight percent of an emulsifier comprising a mixture of sodium phosphate and sodium carbonate in approximately equal amounts, based on the total weight of the solidifying composition, was added to the waste product and mixed therewith. After 3 days the mixture of waste product and solidifying composition of the invention solidified in a form akin to soapstone.

EXAMPLE 5

Approximately 125 ml. of 1,2 dichloroethane and 100 ml. of water were mixed together to simulate a liquid waste. About 250 ml. of the same solidifying composition of the invention disclosed in Example 1, having added thereto of dry emulsifier comprising a mixture of sodium phosphate and sodium carbonate in approximately equal amounts, based on the total weight of the solidifying composition, was added to the waste product and mixed therewith. After 3 days the mixture of waste product and solidifying composition of the invention solidified in a form akin to soapstone.

EXAMPLE 6

Approximately 125 ml. of benzene and 100 ml. of water were mixed together to simulate a liquid waste. About 250 ml. of the same solidifying composition of the invention disclosed in Example 1 was added to the waste product and mixed therewith. After 3 days the mixture of waste product and solidifying composition of the invention solidified in a form akin to shale.

EXAMPLE 7

Approximately 125 ml. of acetonitrile and 100 ml. of water were mixed together to simulate a liquid waste. About 250 ml. of the same solidifying composition of the invention disclosed in Example 1, having added thereto 9 weight percent of emulsifier comprising a mixture of sodium phosphate and sodium carbonate in approximately equal amounts, based on the total weight of the solidifying composition, was added to the waste product and mixed therewith. After 3 days the mixture of waste product and solidifying composition of the invention solidified to a semi-solid state.

EXAMPLE 8

Approximately 125 ml. of sodium hydroxide and 100 ml. of water were mixed together to simulate a liquid waste. About 250 ml. of the same solidifying composition of the invention disclosed in Example 1 was added to the waste product and mixed therewith. After 3 days the mixture of waste product and solidifying composition of the invention solidified to rock-like hardness.

EXAMPLE 9

Approximately 125 ml. of ascetic acid and 100 ml. of water were mixed together to simulate a liquid waste. About 250 ml. of the same solidifying composition of the invention disclosed in Example 1 was added to the waste product and mixed therewith. After 3 days the mixture of waste product and solidifying composition of the invention solidified in a form akin to shale.

EXAMPLE 10

Approximately 125 ml. of a mixture of lead, zinc and cadmium and 100 ml. of water were mixed together to simulate a multi-phase liquid waste. About 250 ml. of the same solidifying composition of the invention disclosed in Example 1 was added to the waste product and mixed therewith. After 3 days the mixture of waste product and solidifying composition of the invention solidified to rock-like hardness.

EXAMPLE 11

Approximately 250 ml. of oil well drilling mud and 100 ml. of water were mixed together to simulate a multi-phase liquid waste. About 300 ml. of the same solidifying composition of the invention disclosed in Example 1, having added thereto 9 weight percent of an emulsifier comprising a mixture of sodium phosphate and sodium carbonate in approximately equal amounts, based on the total weight of solidifying composition, was added to the waste product and mixed therewith. After 3 days the mixture of waste product and solidifying composition of the invention solidified in a form similar to light cement.

EXAMPLE 12

A simulated waste material was made from the following ingredients in the following amounts indicated in percent of ingredient by weight.

| INGREDIENT | WEIGHT PERCENT |
| --- | --- |
| Water | 20 |
| Ammonium Hydroxide | 10 |
| Magnesium Oxide | 10 |
| Mineral Oil | 10 |
| Dichloromethane | 10 |
| Methanol | 10 |
| Acetone | 10 |
| Sodium Hydroxide | 10 |
| Copper Sulphate | 10 |

The total weight of the above ingredients was 6 lbs. A solidification composition was prepared as follows and contained the following ingredients in the following percentages by weight.

| INGREDIENT | WEIGHT PERCENT |
| --- | --- |
| Portland cement, type I | 40 |
| Calcium Sulphate Dihydrate | 20 |
| Enviroguard ® | 25 |
| Sodium phosphate and sodium carbonate in approximately equal amounts by weight | 15 |

The solidification composition was mixed with the simulated waste. Eight hours after mixing, the mixture had the consistency of a watery sludge from which strong odors eminated. Twenty-fours hours after mixing, the mixture was similar in appearance to a heavy mud. Thirty-six hours after mixing, the mixture appears as a dark shale. However, it was friable when crushed by hand.

One week after mixing the mixture had received about four inches of rain and had reverted back to sludge. The mineral oil remained in a semi-solid state. It was concluded that reducing the bonding matrix (Portland cement) and fixative (calcium sulphate dihydrate) did not yield satisfying results. It was concluded however, that increasing the emulsifier ratio had a positive effect on the oil consistent.

EXAMPLE 13

A waste product known in the art as API separator sludge was treated with the solidification composition of the invention. API separator sludge is a viscous, but easily poured, oil sludge containing sulfides and iron. API separator sludge is a common waste resulting from the refining of gasoline and diesel fuel. The following solidification composition was used to mix with the API separator sludge. The solidification composition had the following ingredients in the indicated percentages by weight:

| INGREDIENT | WEIGHT PERCENT |
| --- | --- |
| Portland cement | 50 |
| Calcium Sulfate Dihydrate | 20 |
| Enviroguard ® | 20 |
| Sodium phosphate and sodium carbonate in approximately equal amounts by weight | 10 |

Approximately 1½ lbs. of API sludge and 4½ lbs. of the composition mentioned above along with 1⅓ pints of water were added to a plastic container and stirred for ten minutes with a wooden paddle. Ten minutes after mixing a definite thickening was observed. The mixture appeared as light mud.

After eight hours the mixture appeared as a heavy mud and water begin to collect on the surface of the mixture.

Twenty-four hours after mixing the mixture appeared as a light asphaltic material and water continue to collect on the surface.

After thirty-six hours the mixture was moist and some what pliable.

After forty-eight hours the mixture was removed from the container in ingot form. The ingot was then exposed to sunlight and air for a period of 2 hours and the ingot developed a cementitious like crust around the outside of the ingot.

The ingot was broken open in the pail where it fell apart; however, the broken particles of the ingot were solidified to a moist, dirt-like substance.

The dirt-like substance was soaked with water for approximately for twenty-four hours. Even though it became mushy it never reverted back to a sludge.

The dirt-like product was spread out in a box to about ½ inch thickness, then exposed to sunlight and air for eight hours. It became a dry, dirt like substance.

EXAMPLE 14

Into a plastic container was poured approximately 1 lbs of the sludge disclosed in Example 13 and 3 lbs. of the solidification composition disclosed in the Example 13 along with 1 pint of water. These components were mixed for approximately five minutes with a wooden paddle.

Ten minutes after mixing a definite thickening was observed and the mixture appeared as a heavy sludge.

Eight hours after mixing, the mixture appeared as a light, fluid asphaltic product.

Twenty-four hours after mixing the mixture appeared as a hardening sludge.

Thirty-six hours after mixing the mixture was moist and pliable, and water had collected on the surface.

Forty-eight hours after mixing the mixture was removed from the container in ingot form. The ingot was exposed to sunlight and air for approximately 2 hours, and the ingot developed a cementitious like crust around it.

The ingot was broken apart and the particles from the ingot had solidified to a moist, dirt-like substance.

EXAMPLE 15

Into a plastic container was poured approximately 1 lb. of the sludge used in Example 13 and 2 lbs. of the solidification composition used in Example 13. The sludge contained approximately 0.5 percent by weight of water. The sludge and solidification composition were mixed approximately five minutes with a powder drill fitted with a stirring attachment.

Ten minutes after mixing the sludge appeared as a black gelatinous mass.

Eight hours after mixing the mixture appears as a heavy, sticky asphaltic material.

Twenty-four hours after mixing the sludge appeared as a heavy, sticky asphaltic material.

Thirty-six hours after mixing some additional hardening was noticed but the sample remained a sticky mass.

Further observations were discontinued.

EXAMPLE 16

Into a plastic container was poured 1 lb. of the sludge of Example 13 and 3 lbs. of the following solidification composition containing the listed ingredients in the percentages by weight as indicated.

| INGREDIENTS | WEIGHT PERCENT |
| --- | --- |
| Portland cement | 60 |
| Calcium Sulphate Dihydrate | 25 |
| Enviroguard ® | 7 |
| Sodium phosphate and sodium carbonate in approximately equal amounts by weight | 8 |

The sludge and solidification composition was mixed for ten minutes with power drill fitted with a stirring attachment.

After ten minutes the mixture appeared as a semi-dry mix.

Fifteen minutes after mixing the mixture appeared as a heavy, thickening sludge.

Eight hours after mixing the mixture appeared as a fast drying spongy mass.

Twelve hours after mixing the mixture appeared as a fast drying spongy mass.

Twenty-four hours after mixing the mixture was only slightly oily and was pliable. The mixture was removed from the container intact as a ingot. The ingot was broken open in a pail where it fell apart into particles having a solidified dirt-like appearance. The dirt-like particles were dryer than those produced in Example 13.

EXAMPLE 17

Into an aluminized pan 12" long × 10" wide × 2½ deep was poured 2 lbs. of sludge of the sludge used in Example 13 to which 4 lbs. of the solidification composition used in Example 16 was added. The ingredients were mixed approximately five minutes to a thickness of 11/8 inches.

After ten minutes the mixture appeared as a heavy, thickening mud.

Eight hours after mixing the mixture appeared as a fast drying spongy mass and the appearance was the same 12 hours after mixing.

Twenty-four hours after mixing the mixture was slightly oily, but pliable to downwardly pressure.

Thirty-six hours after mixing the mixture formed cementitious crust on the surface. Removal of crust revealed a slightly moist, dirt-like substance.

EXAMPLE 18

Into a 5 gallon pail was poured approximately 8 lbs. of the sludge of Example 13 to which was added 24 lbs. of the solidification composition disclosed in Example 4. The ingredients in the pail were mixed for approximately 15 minutes with a powder drill fitted with a stirring attachment.

Fifteen minutes after mixing the mixture appeared as a heavy thickening mud.

Eight hours after mixing the mixture appeared as a fast drying spongy mass and the appearance did not change upon observation at 12 hours after mixing.

Twenty-four hours after mixing solidification was observed to a depth of 2 inches. Below the 2 inch depth the mixture was similar to an asphaltic material.

Thirty-six hours after mixing drying continued and a cementitious crust appeared on the surface of the mixture.

Forty-six hours after mixing the mixture began to take on a dirt-like appearance and characteristics.

Sixty hours after mixing the mixture had solidified to a depth of 5½ inches which was the bottom of the pail. The mixture was somewhat coagulated at the 3 inch depth but nevertheless solidified.

It was observed from experiments 13 through 18 that it is not necessary to add water to the sludge for the process to commence, and that a 3 to 1 ratio of solidification composition to sludge appears to be superior to a 2 to 1 ratio of solidification composition to sludge. Furthermore, when the sludge and solidification composition mixture was exposed to sunlight and air at 11/8 inch thickness the solidification process is hastened. The solidification composition of the present invention when mixed with API separator sludge was solidified to a dirt-like substance. This dirt-like substance when exposed to water and rain may again become like a heavy mud but will not revert back to a liquid sludge and will dry out upon expose to sunlight. Furthermore, it appears that a 60:25:7:8 ratio of the ingredients of the solidification composition of the invention is superior to the 50:20:10:10 ratio, although the 50:20:10:10 ratio is useful.

EXAMPLE 19

A waste sludge was prepared from 248 ml. of salt brine containing 2 ml. of oil (weight 12 oz) and was mixed with 500 ml (weight 20 oz) of the solidification composition disclosed in Example 16. The ingredients were mixed for 10 minutes.

After 8 hours approximately 10 ml. of water was observed on the surface of the hardening mixture. Salt and oil were contained in the mixture.

Thirty-six hours after mixing the mixture had taken on a dark grey appearance and the mixture was similar to a heavy asphaltic material. A slight impression could be made in the material at approximately 24 PSI of downward pressure.

Forty-eight hours after mixing solidification was complete and the mixture had the hardness of light concrete.

EXAMPLE 20

About 200 ml. of salt brine containing 50 ml. of oil (weight 15 oz) was mixed with 500 ml. (weight 20 oz) of the solidification composition disclosed in Example 16. The ingredients were mixed for 10 minutes.

Eight hours after mixing approximately 10 ml. of water was observed of the surface of the hardening mixture. Salt and oil were contained.

Thirty-six hours after mixing the mixture had taken on a dark grey appearance and the mixture was similar to a heavy asphaltic material. A slight impression could be made in the material at approximately 24 PSI of downward pressure.

Forty-eight hours after mixing solidification was complete and the mixture had the hardness of light concrete.

EXAMPLE 21

About 250 ml. of salt brine containing 100 ml. of oil contaminated mud (weight 18 oz) was mixed with 500 ml. (weight 20 oz) of the solidification composition disclosed in Example 16. The ingredients were mixed for 15 minutes.

Eight hours after mixing approximately 20 ml. of water was observed on the surface of the hardening mixture. The water was poured through a filter cloth to separate residual oils from the water. Only a oil sheen was noticeable on the cloth. The salt and mud were contained.

Thirty-six hours after mixing the mixture had taken on a dark grey appearance and was similar to an asphaltic material. An impression could be made with approximately 24 PSI of downward pressure.

Forty-eight hours after mixing the mixture had retained a dark grey appearance but at fifty-six hours after mixing it turned to a light grey and assumed the hardness of light concrete.

Although the preferred embodiments of the present invention have been disclosed and described in detail above, it should be understood that the invention is in no sense limited thereby, and its scope is to be determined by that of the following claims:

What is claimed is:

1. A composition for converting wastes to a solid or semi-solid state comprising:
   a. about 50 percent to about 65 percent by weight of Portland cement,
   b. about 20 percent to about 28 percent by weight of a fixative selected from the group consisting of calcium sulfate, compounds of calcium sulfate with water, calcium carbonate, and compounds of calcium carbonate with water,
   c. about 5 percent to about 20 percent by weight of biogenetic, amorphous, silica ash, and
   d. about 5 percent to about 10 percent by weight of an emulsifier selected from the group consisting of sodium phosphate and sodium carbonate, and mixtures thereof.

2. The composition of claim 1 wherein said cement is Portland cement Type I.

3. The composition of claim 1 wherein said fixative in calcium sulfate dihydrate.

4. The composition of claim 1 wherein said biogenetic, amorphus, silica ash contains about 5 percent carbon by weight.

5. The composition of claim 1 wherein said emulsifier is a detergent.

6. The composition of claim 1 wherein said composition comprises from about 50 to 60 percent by weight of Portland cement, about 20 to 25 percent by weight of said fixative, about 7 to about 20 percent by weight of said biogenetic, amorphous silica ash, and about 5 to about 10 by weight of said emulsifier.

* * * * *